United States Patent [19]

Kreuer et al.

[11] 4,132,838

[45] Jan. 2, 1979

[54] PROCESS AND APPARATUS FOR THE PREPARATION OF A REACTION MIXTURE FOR THE PRODUCTION OF PLASTIC FOAMS

[75] Inventors: Karl D. Kreuer; Klaus Schulte, both of Leverkusen, Germany

[73] Assignee: Bayer Aktiengesellschaft, Leverkusen, Germany

[21] Appl. No.: 725,600

[22] Filed: Sep. 22, 1976

[30] Foreign Application Priority Data

Oct. 4, 1975 [DE] Fed. Rep. of Germany ....... 2544559

[51] Int. Cl.² .................... C08G 18/08; C08G 18/14; B01J 1/00
[52] U.S. Cl. .................................. 521/50; 521/917; 422/133
[58] Field of Search .................. 260/2.5 BC, 2.5 BD, 260/2.5 AD

[56] References Cited

U.S. PATENT DOCUMENTS

| 2,730,433 | 1/1956 | Cartledge | 260/75 NE X |
| 3,286,992 | 11/1966 | Armeniades et al. | 260/2.5 BC |
| 4,022,722 | 5/1977 | Prokai et al. | 260/2.5 AP |

OTHER PUBLICATIONS

Knox- DuPont Foam Bulletin, Sept. 12, 1960, 1 page.

*Primary Examiner*—H.S. Cockeram
*Attorney, Agent, or Firm*—Gene Harsh; Joseph C. Gil; R. Brent Olson

[57] ABSTRACT

The instant invention relates to a process and apparatus for the preparation of a reaction mixture for the production of foam materials from at least two components, wherein one of the components, before it is mixed with the remaining components to form the reaction mixture, is passed through a constriction at a predetermined flowrate. The constriction produces a zone of reduced pressure and a gas is fed into the reduced pressure zone.

3 Claims, 7 Drawing Figures

U.S. Patent   Jan. 2, 1979   Sheet 1 of 2   4,132,838
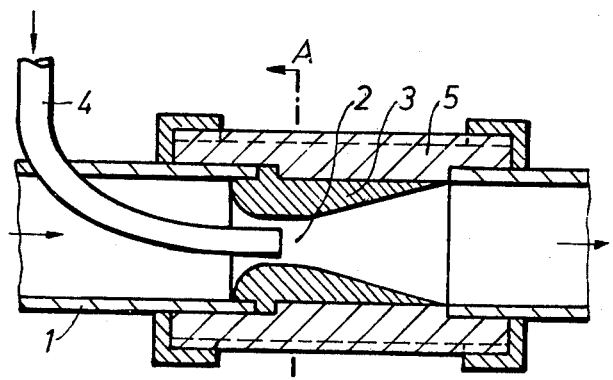
FIG. 1
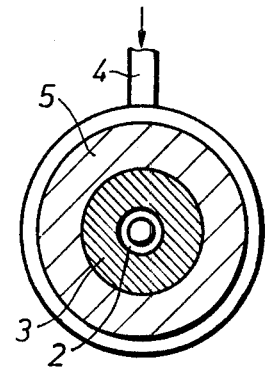
FIG. 2 (A-B)
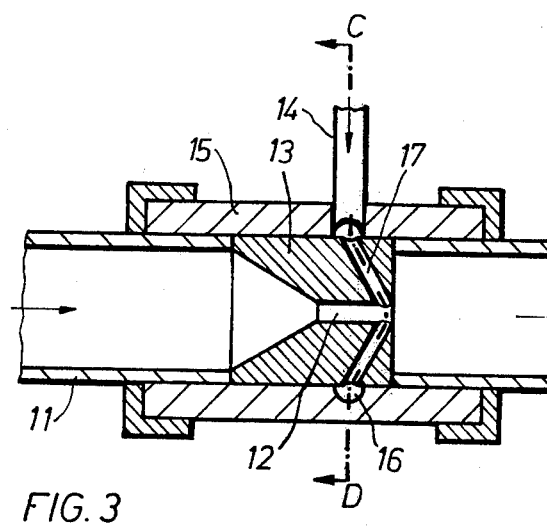
FIG. 3
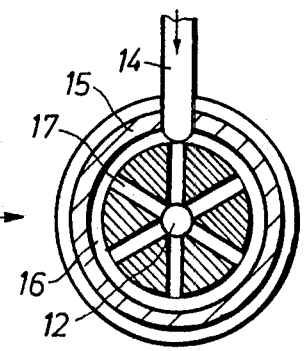
FIG. 4 (C-D)

PROCESS AND APPARATUS FOR THE PREPARATION OF A REACTION MIXTURE FOR THE PRODUCTION OF PLASTIC FOAMS

BACKGROUND OF THE INVENTION

The present invention relates to a process and apparatus for the preparation of a reaction mixture from at least two components for the production of plastic foams, in particular those based on polyurethane, in which at least one of the components is charged with air or other gas, before mixing with the other component takes place.

In order to induce cell formation in the foaming reaction, a specific quantity of a gas, such as air, must be contained in the reaction mixture in the form of fine bubbles, which serve as nuclei in the foaming reaction. Depending on the various foam material systems required, a varying quantity of gas is required for this nucleus formation. In the production of polyurethane foam the gas is preferably introduced into the polyol component, in order to reduce its viscosity, but it is also quite possible to mix it in with the isocyanate component.

For this purpose a gas, such as air, is introduced into one of the reaction components, which carries the gas with it into the mixing chamber. Alternatively, the gas is introduced directly into the mixing chamber. The first mentioned method has been carried out up till now, because with the decompression of the gas charged component in the mixing chamber the gas is better distributed. The term "gas charge" of the reaction components is used. This is understood to mean the quantity of gas which is contained in the reaction component in the form of undissolved finely distributed gas bubbles.

The mixing of air or other gas into the reaction component is effected for example by means of a mixing lance or by means of a fast running agitator in the storage container. The gas or air may also be introduced into the component flow or into a pre-mixing chamber via a dosing device through sintered metal or injection nozzles. Finally the component may also be recirculated by means of pumps, with the return flow being introduced into the gas chamber of the storage container under supply pressure, and thus absorbs gas, insofar as the return pipe is arranged above the level of the component stored in the storage container, so that when flowing out of the return pipe, the component comes into contact with the air or other gas introduced into the storage container.

All these methods are extremely inaccurate and uncertain and hitherto have been carried out purely according to trial and error. Therefore in previous methods, control of the gas was extremely unstable. The only control was the visual evaluation of the finished product. If in structural hard plastic foams, the color for example was dark brown, then it contained too little gas and/or the gas was insufficiently mixed with the reaction component. If the color was light brown the gas properties were correctly selected. However if the color was light brown with surface bubbles, it either contained too much gas or the gas was not sufficiently finely distributed in the reaction component.

The object of the present invention therefore is to provide an apparatus with which a gas, such as air, can be mixed with at least one of the reaction components, preferably the polyol, intensively and homogeneously by simple means.

BRIEF DESCRIPTION OF THE DRAWINGS

FIG. 1 shows a constriction in the form of a Venturi tube.

FIG. 2 shows a view according to the section A/B in FIG. 1.

FIG. 3 shows a constriction in the form of a mixing nozzle.

FIG. 4 shows a view according to the section C/D in FIG. 3.

DESCRIPTION OF THE INVENTION

Figure 5:
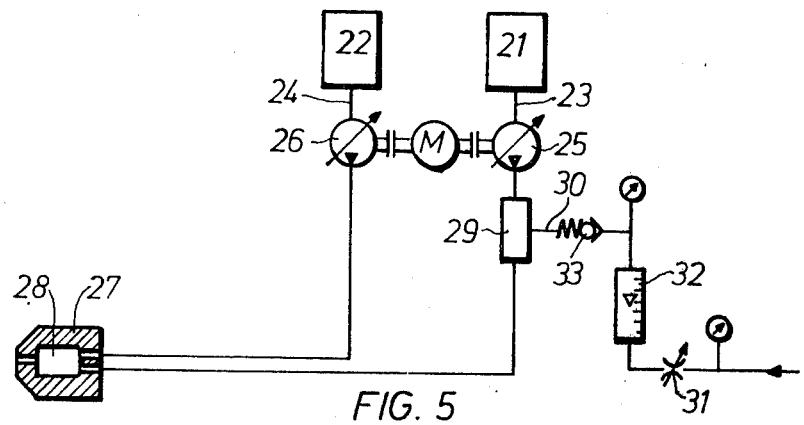
FIG. 5 shows the apparatus with the constriction 29 in the high pressure section.

According to the invention, there is provided a process for the preparation of a reaction mixture for the production of foam materials from at least two components, wherein at least one of the components is passed through a constriction at which a predetermined velocity is maintained and there is produced a zone at a reduced pressure and a gas is fed into the reduced pressure zone.

According to a particular embodiment of the process, the velocity of the component in the constriction is maintained at over 5 meters/second, and, preferably at over 20 meters/second. The flow rate is regulated by conventional means. Suitable volumetric flow rate measurement devices include gear flowmeters, oval wheel meters, and turbine or rotary piston meters.

The necessary flow rate which permits a good, intensive mixing of the gas with the component depends on many parameters, such as the viscosity (which in turn is temperature-dependent), the level of the reduced pressure, the compressibility of the components, the ratio of the flow cross-section at the point of construction to the preceding flow cross-section, and the like. However it has proved that a velocity of at least 5 meters/second generally effects a sufficient mixing of the gas in the component. In the case of polyols with viscosities of below 2000 cP, at a velocity of the component of at least 20 meters/second, the air supplied distributes itself extremely finely and homogeneously. The gas or the air supplied is regulated so that the quantity of gas to be absorbed is precisely controlled. The flow rate is chosen so as to obtain sufficient mixing of the gas in the component; the greater the flow rate the greater the mixing.

These measures permit the production of a foam material which is distinguished by particular homogeneity and which is capable of responding to high stresses. It is of particular significance that various foam plastics systems can be produced using the process according to the invention in reproducible quality, i.e. with low tolerance ranges for their properties.

According to the invention, there is also provided an apparatus for the preparation of a reaction mixture for the production of foam materials from at least two components, said apparatus comprising a storage container for each component, from each of which a pipe leads via a dosing pump to the mixing chamber of a mixing head, and optionally a return pipe leads from the mixing head back to the storage container. A constriction is provided in the piping system in at least one of the components and a gas feed pipe opens into the piping system in the region of the constriction.

This constriction produces an acceleration effect, which generates the reduced pressure, which is necessary in order to draw in the dosed gas.

In a particular embodiment of the apparatus according to the invention the constriction is in the form of a Venturi tube. In this arrangement, similar to a water jet pump, gas introduced centrally into the jet through the flowing component is carried along by the jet and in this way mixed.

According to a further particular embodiment the constriction comprises a mixing nozzle, which is provided with a bore coaxial to the axis of the pipe, into which there opens a plurality of gas channels which are connected at the other end with the gas feed pipe. The gas feed pipe ends for example in an annular channel, from which the gas channels lead off at uniform intervals. They may open into the component through-flow bore at any angle, preferably a right angle.

It is of particular advantage that the constriction can be arranged at any point in the piping system, i.e. for example upstream of the dosing pump in the so called low pressure section or downstream of the dosing pump in the so called high pressure section or even in the return pipe.

The apparatus according to the invention is shown purely schematically in a number of embodiments in a drawing and is further illustrated below with reference to the process.

In FIGS. 1 and 2, a constriction 2 is provided in a pipe 1, in the form of a Venturi tube 3, whereby a gas pipe 4 opens centrally into the constriction 2 which takes the form of a nozzle channel. The constriction 2 with the Venturi tube 3 is arranged in a housing 5, which can be inserted into the pipe 1.

In FIGS. 3 and 4 a constriction 12 is arranged in a pipe 11. It consists of a mixing nozzle 13, which is arranged in a housing 15 which can be inserted into the pipe 11. A gas feed pipe 14 extends through the housing 15 and opens into an annular channel 16, from which a plurality of gas channels 17 lead into the bore of the constriction 12.

In FIG. 5 the apparatus consists of storage containers 21, 22, for polyol and isocyanate respectively, from which pipes 23, 24 lead via dosing pumps 25, 26 to a mixing head 27, in which a mixing chamber 28 is arranged. In the pipe 23 there is arranged in the high pressure section a constriction 29, into which a gas feed pipe 30 opens. In the gas pipe 30 there is regulatable throttle valve 31, a flowmeter 32 and a check valve 33.

Figure 6:
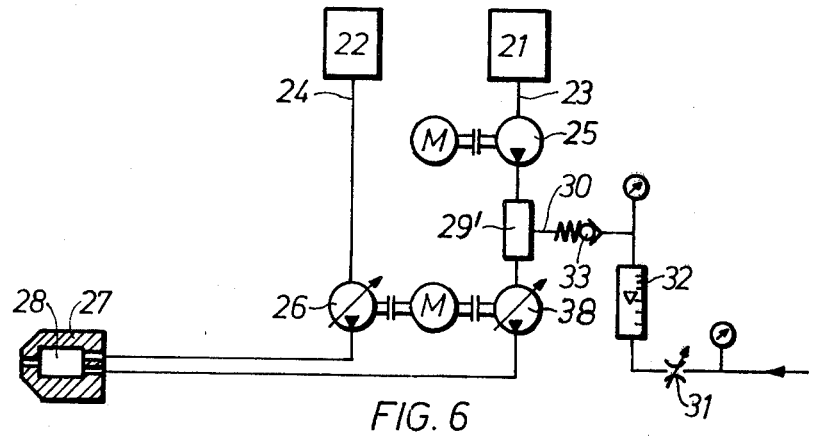
FIG. 6 shows the apparatus with the constriction 29' in the low pressure section.

The apparatus according to FIG. 6 differs from that of FIG. 5 merely in that the constriction 29' is arranged in the low pressure section of the pipe 23, thus upstream of the dosing pump 38.

Figure 7:
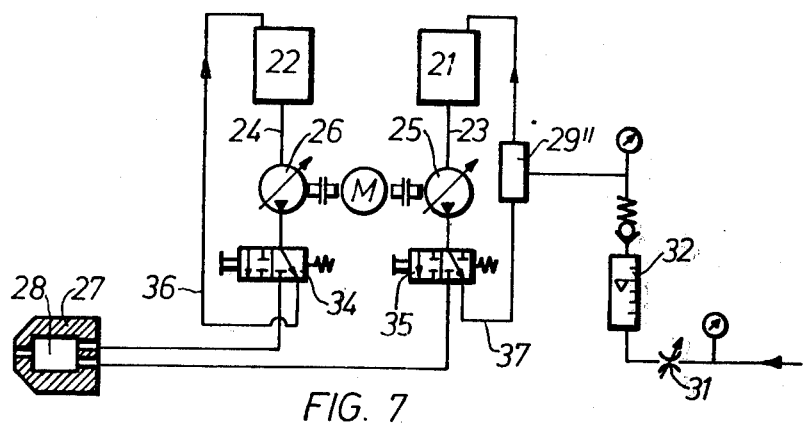
FIG. 7 shows the apparatus with the constriction 29" in the reflux pipe.

The apparatus according to FIG. 7 also differs from that of FIGS. 5 and 6. In the pipes 24, 23 changeover valves 34, 35 are provided before which return pipes 36, 37 lead back to the storage containers 21, 22. The constriction 29" is here arranged in the return pipe 37.

The present invention is particularly adapted for use in the production of polyurethane foam. As is well known in the art such foams are generally produced by reacting organic isocyanates, and active-hydrogen containing materials in the presence of blowing agents. Preferred active-hydrogen containing materials are polyether polyols, polyester polyols and the like. As known in the art, these foams are produced by mixing two or more streams, one stream containing the isocyanate and one stream containing the active hydrogen containing material.

What is claimed is:

1. In a process for the preparation of a reaction mixture for the production of foam materials from at least two components comprising an active hydrogen containing material and a polyisocyanate, wherein at least two separate component streams are brought together and mixed, the improvement comprising passing at least one of the streams through a constriction at a predetermined velocity thereby producing a zone at a reduced pressure and feeding a gas into said reduced pressure zone and then passing the resulting combined stream into a zone having a cross-sectional area larger than the cross-sectional area of said reduced pressure zone before mixing the component streams.

2. The process recited in claim 1, wherein said predetermined velocity is at least 5 meters/second.

3. The process recited in claim 2, wherein said predetermined velocity is at least 20 meters/second.